United States Patent [19]
Bowes

[11] Patent Number: 5,435,350
[45] Date of Patent: Jul. 25, 1995

[54] CORRUGATED PLASTIC FLANGE PROTECTIVE COVER

[75] Inventor: William G. Bowes, Union City, Pa.

[73] Assignee: Bunzl Plastics, Inc., St. Louis, Mo.

[21] Appl. No.: 249,967

[22] Filed: May 27, 1994

[51] Int. Cl.6 .............................................. B65D 59/06
[52] U.S. Cl. .................................. 138/96 R; 138/109
[58] Field of Search ................... 138/96 R, 96 T, 89, 138/109; 220/324, 326, 215; 285/334.2

[56] References Cited

U.S. PATENT DOCUMENTS

| | | | |
|---|---|---|---|
| 1,903,220 | 3/1933 | Lemert . | |
| 2,118,073 | 5/1938 | Dittmeyer | 138/96 R |
| 3,563,277 | 2/1971 | Klipper | 138/96 |
| 3,800,486 | 4/1974 | Harvey | 138/96 R |
| 3,856,050 | 12/1974 | Rooney | 138/89 |
| 3,942,681 | 3/1976 | Richardson | 138/96 R X |
| 4,114,655 | 9/1978 | Bloker | 138/89 |
| 4,146,180 | 3/1979 | Dettling | 138/96 R |
| 4,157,100 | 6/1979 | Turk | 138/96 R |
| 4,158,407 | 6/1979 | Rest | 138/96 R |
| 4,168,726 | 9/1979 | Klennert | 138/96 R |
| 4,295,680 | 10/1981 | Grasso | 220/215 |
| 4,423,753 | 1/1984 | Smith et al. | 138/96 R |
| 4,799,716 | 1/1989 | Kujawa et al. | 138/89 X |
| 4,869,293 | 9/1989 | Botsolas | 138/96 T |
| 5,265,752 | 11/1993 | Olson | 220/380 |
| 5,337,792 | 8/1994 | Tempel | 138/96 R |

FOREIGN PATENT DOCUMENTS

| | | |
|---|---|---|
| 757447 | 9/1956 | United Kingdom . |
| 2037961 | 7/1980 | United Kingdom ............... 220/215 |

OTHER PUBLICATIONS

Woodruff Corp., "The Performance Leaders in Plastic Fabrication", Richmond, Ind., no date, but known to applicant before the filing date of this application.

ICC Primex Plastics Corp., "COR X ™ Polypropylene Board Product Guide", Richmond, Ind., no date, but known to applicant before the filing date of this application.

*Primary Examiner*—David A. Scherbel
*Assistant Examiner*—James F. Hook
*Attorney, Agent, or Firm*—Oliff & Berridge

[57] ABSTRACT

A flange protector is made from a lightweight and inexpensive corrugated plastic material having good resistance to impact, weathering and fading. The protector has a double-walled corrugated construction. Circular end walls are connected with interior wall members that serve as impact resistant spring members and define a plurality of air channels.

19 Claims, 3 Drawing Sheets

CORRUGATED PLASTIC FLANGE PROTECTIVE COVER

BACKGROUND OF THE INVENTION

1. Field of the Invention

This invention relates to flange protectors, and more particularly to a lightweight, weather resistant corrugated plastic flange protector adapted for temporary application to the flange of a pipe, valve or other conduit so as to protect the machined surface of the flange from damage during shipment and handling.

2. Discussion of Related Art

Flange protectors are known in the art for covering and protecting pipe flanges of the type having a machined flange surface and bolt holes that extend through the flange surface and open to a back surface opposing the flange surface. For example, see U.S. Pat. Nos. 5,265,752; 4,799,716; 3,942,681; 3,856,050; 3,563,277; 1,903,220; and British Patent 757,447. While these prior art flange protectors are suitable for ideal conditions, they are manufactured from relatively expensive, heavy and weather prone materials that result in overall higher costs. In addition, prior art flange protectors made of hardboard or cardboard covers are particularly susceptible to rough handling in wet weather since protectors made from these materials can often tear away from retaining bolts or clips.

A prior art solution to counteract wet weather was to manufacture the flange protectors from high density solid plastic and polystyrene. See for example, U.S. Pat. Nos. 3,856,050 and 3,563,277. These materials, however, lack adequate shock absorbing qualities.

Alternatively, pipe ends have been known to be protected by using a fabric and paper bonded together with a water proof material as shown in British Patent 757,477. This type of protector requires substantial assembly time and multiple parts.

In addition, prior art flange protectors have been made with impact resistant material such as solid rubber, polyethylene (U.S. Pat. No. 5,265,752), silicone (U.S. Pat. No. 4,799,716); and styrofoam (U.S. Pat. No. 3,942,681). In still yet another alternative, another prior art solution provides a multi-layered flange protector having a metal shell with a compressible material (U.S. Pat. No. 1,903,220).

In summary, prior art cardboard or hardboard flange protectors fail to display adequate weather resistant properties. In addition, while the solid plastic prior art flange protectors may exhibit acceptable weather resistance, they lack sufficient impact resistance and are heavy and expensive to manufacture. Finally, while the solid rubber flange protectors demonstrate some impact resistance, these designs fail because they easily disintegrate, require an expensive solid construction, and are heavy.

SUMMARY OF THE INVENTION

It is thus an object of the invention to provide a lightweight flange protector that displays excellent weather and impact resistance.

Another object is to provide such a weather and impact resistant flange protector using an inexpensive and lightweight material.

To achieve these and other objects and advantages, the inventive pipe surface or flange protector of the present invention is a disk of flexible material having a size corresponding to a size of the outer surface of a pipe surface or flange to selectively cover the flange. The flexible material includes a corrugated sheet made from a lightweight and weather proof plastic, such as polypropylene copolymer. The flexible material includes a double-walled corrugated construction in which a plurality of parallel air channels are provided between the walls of the flange protector. With this construction, it is possible to produce an inexpensive and lightweight flange protector having excellent impact and weather resistance.

BRIEF DESCRIPTION OF THE DRAWINGS

These and other objects and unexpected advantages of the invention will become apparent from the following detailed description of the preferred embodiments taken in conjunction with the following figures wherein.

DETAILED DESCRIPTION OF PREFERRED EMBODIMENTS

Figure 4:
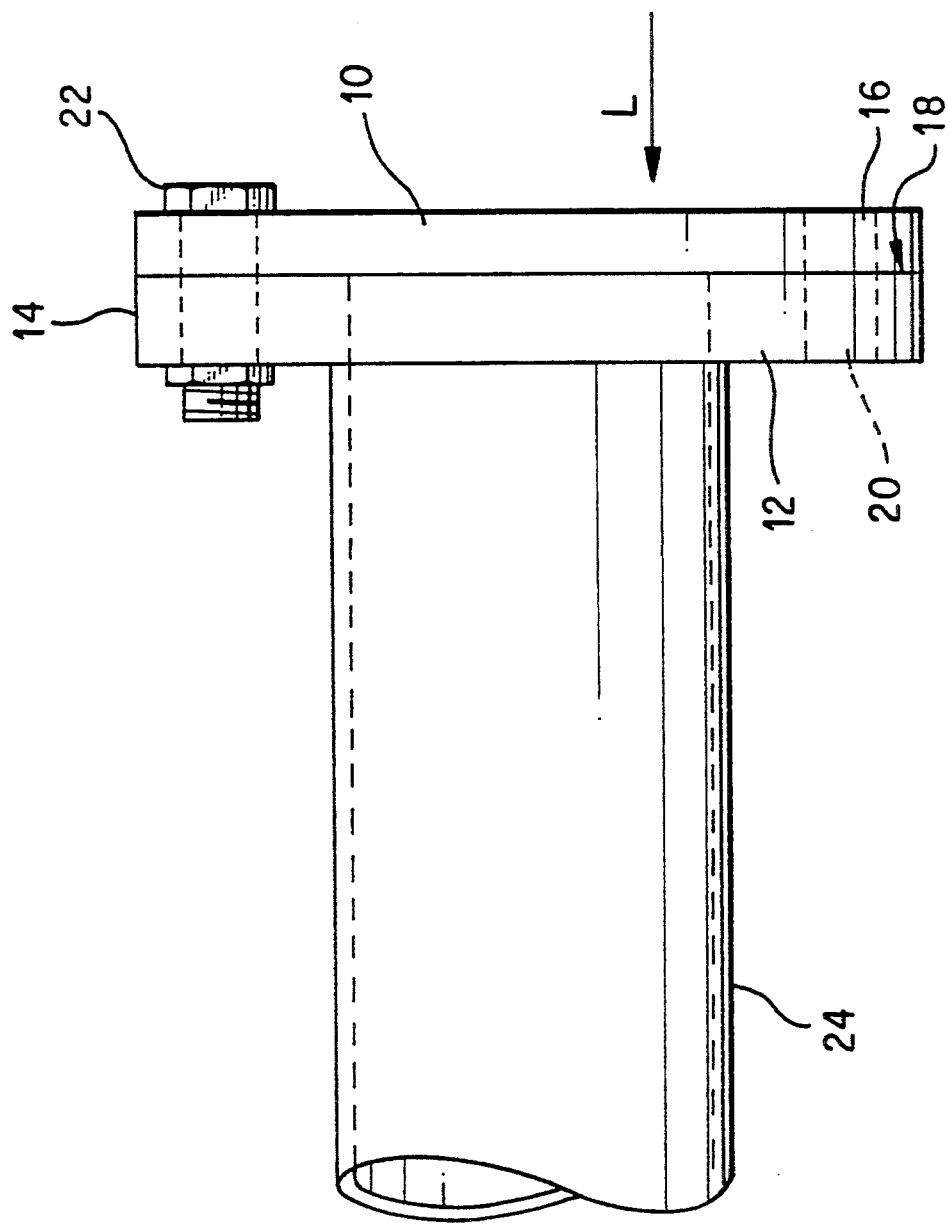
FIG. 4 is a schematic view of the flange protector connected to a flanged pipe.

FIG. 4 shows a flange protector 10 for protecting flanges used in making connections to pipes, valves and the like. Such flanges are made to Army, Navy and ASA standards and are characterized by a hub 12 that may be connected to or integral with a pipe 24 or valve, a flange 14 integral with a hub 12 and having bolt holes 20 for bolting the flange 14 to a corresponding mating flange of another pipe (not shown) to make a fluid tight connection, and a machined (gasket) surface 18 on the sealing face of the flange against which a gasket (not shown, but optional) may be compressed when the flanges are bolted together.

Rough or irregular machined flange surfaces require greater deformation of the gasket and therefore greater bolt pressure to effect a seal. Accidental scratches, dents or nicks in the machined surface 18 of the flange caused by bumping during transit may cause leakage. It is therefore essential that the machined surface 18 be protected until the flange is ready for use. It is also desirable that the protector be made of a lightweight, impact resistant and weather resistant material.

The present invention provides a single piece flange protector that incorporates all the advantageous features of the prior art flange protectors, but also includes an inexpensive, lightweight impact resistant, and weather resistant flange having an unexpected superiority and design.

Figure 1:
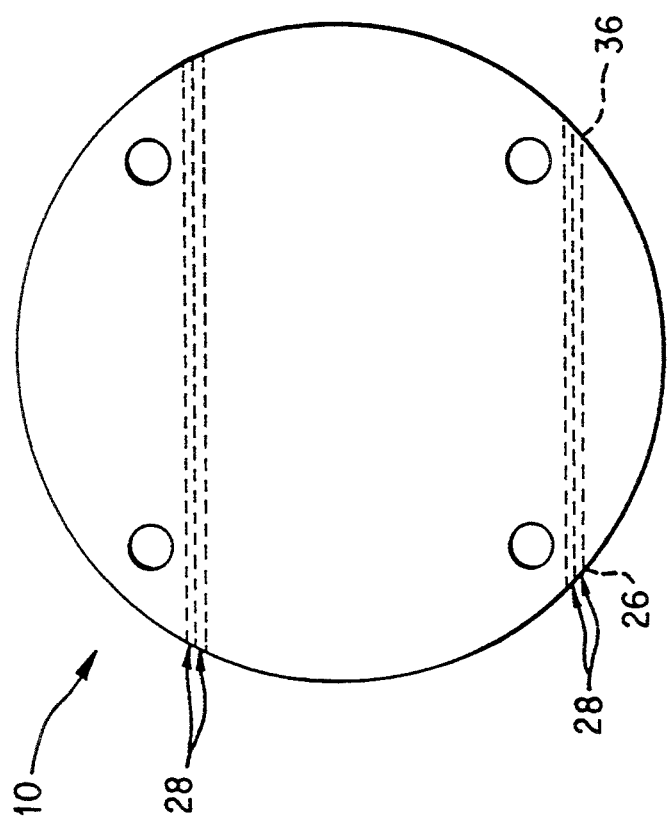
FIG. 1 is a plan view of a non-engaged flange protector disk provided with bolt holes.
Figure 3:
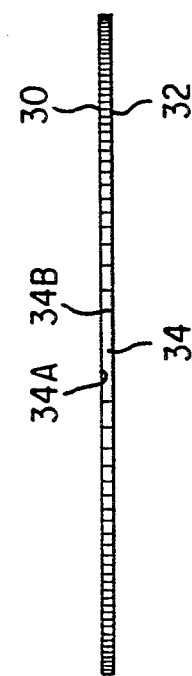
FIG. 3 is a bottom elevational view of the disk of FIG. 1.
Figure 5:
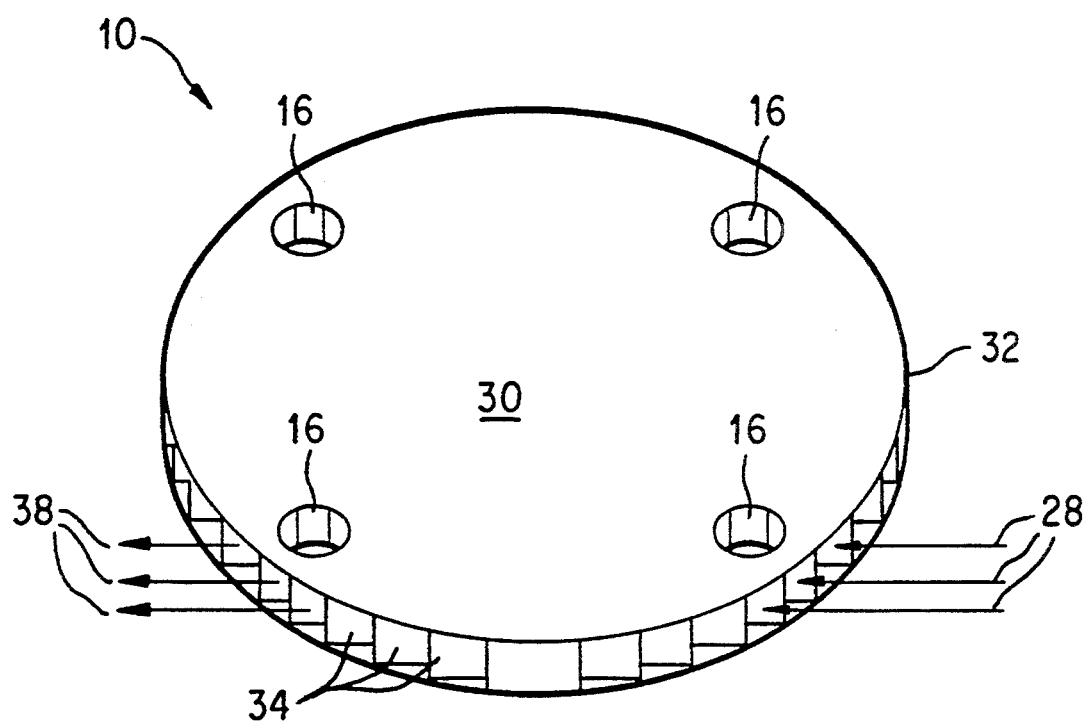
FIG. 5 is a perspective view of a non-engaged flange protector more specifically showing the air channels and corrugated double-wall construction.

The flange protector is a single disk 10 constructed from a plastic flexible material, such as polypropylene, with high resiliency and impact resistance. The disk 10 is cut or punched from a sheet to form the disk having a diameter sufficient to cover the entire flange including the machined surface 10 of the flange or pipe end. The disk 10 can be connected to the end of the flange by such means as would be apparent to those of ordinary skill in the art. For example, a plurality of flange protector bolt holes 16 as shown in FIGS. 1, 4 and 5 can be punched through the disk in alignment with the bolt holes 20 of the flange 14 to allow for fastening of the flange protector to the flange by means of bolts 22 (one shown) passing through the flange protector bolt holes 16 and flange bolt holes 20. As another example, integral cutouts such as are found in U.S. Pat. No. 5,265,752 to Olson (incorporated herein by reference and assigned to the same assignee as the present invention) can be used to attach the flange protector to the flange. Other fastening means such as, but not limited to, screws, clips and ultrasonic welding will be apparent to those of ordinary skill in the art.

Figure 2:
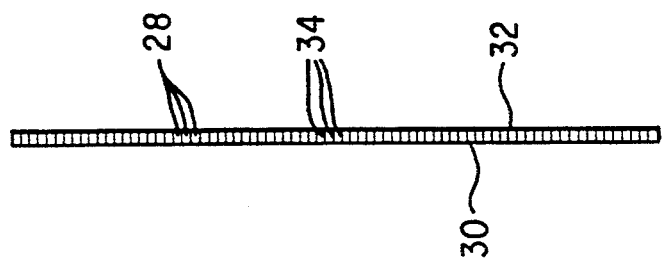
FIG. 2 is a side view of the disk of FIG. 1 showing a plurality of parallel channels.

As shown in FIG. 1, the flange protector 10 also includes a plurality of parallel extending air channels 28. In FIG. 1, only a few of the channels 28 are shown in phantom for the sake of clarity. In FIGS. 2 and 5, the channels 28 are defined by a double walled corrugated plastic construction that provides a lightweight and flexible flange protector. The flange protector includes end walls 30 and 32 between which are disposed the plurality of air channels 28. The air channels 28 are divided and defined by a plurality of parallel interior wall members 34. Each of the interior wall members 34 has a first longitudinal edge 34A connected to the first end wall 30 and a second longitudinal edge 34B connected to the second end wall 32 so as to form a sturdy and unitary structure. Each wall member 34 and air channel 28 defines a chord of the circular flange protector 10, with each chord extending, for example, from a first end 26 to a second end 36 of each of the end walls of the corrugated structure.

Each interior wall member 34 acts as a spring to provide good impact resistance and protection of the flange. Moreover, with the double wall corrugated structure as shown in FIG. 5, each partitioning wall member 34 serves as a leaf spring to lighten impact on the flange in the event that unexpected bumping or impact of a load L (FIG. 4) on the pipe 24 occurs while in transit. In addition, because the flange protector 10 is structured so as to include the plurality of air channels 28, it is lightweight (0.169–0.190 lb./ft.$^2$) when compared to the weight of the flange protectors of the prior art. For example, the solid plastic flange protector of the prior art has a unit weight of 0.5 lb/ft.$^2$, which is approximately two and a half times the weight of the corrugated plastic flange protector of the instant invention. Furthermore, also shown in FIG. 5, the plurality of air channels 28 provide a passage for air 38, thereby providing a further impact dampening effect for the flange protector. If the flange protector is bumped during a transit, the air in the passages acts as a dampening fluid initially resisting the impact but allowing deformation of the interior wall members as the air is forced out of the passages.

As shown in Tables 1–3, the flange protector of the above-mentioned structure and material displays superior operating characteristics when compared to double walled paper corrugated board.

TABLE 1

| MATERIAL | Polypropylene (PP) Copolymer | Paper Corrugated Board |
| --- | --- | --- |
| BOARD THICKNESS/mm | 3 mm, 5 mm | 5.2 mm |
| COMPRESSION LOAD/lbs. | 485, 1455 | 661 |

TABLE 2

| MATERIAL | PP Copolymer | Double Walled Paper Corrugated Board |
| --- | --- | --- |
| BOARD THICKNESS/mm | 3 mm, 5 mm | 7.6 mm |
| COMPRESSION LOAD/lbs. | 717, 1482 | 1753 |
| DISTORTION/in. | .630, .787 | .512 |

TABLE 3

| MATERIAL | High Density Polyethylene | Paper Corrugated Board |
| --- | --- | --- |
| BOARD THICKNESS/mm | 3 mm | 5.2 mm |
| COMPRESSION LOAD/lbs. | 794 | 708 |
| DISTORTION/in. | .472 | .630 |

As shown in Tables 1–3, the flange protector of the present invention displays unexpected superiority with respect to compression and distortion, in addition to being lighter and more weather resistant than double-walled corrugated paper board.

In addition to the demonstrated superior strength, impact resistance, and weather resistance, the flange protector of the above design and materials has a crush resistance 80 lb./in.$^2$. The flange protector can be manufactured by die cutting and may be scored with standard die cutting equipment and rule. The seams can be joined with hot melt or silicone glues, high frequency welding techniques, or metal stitching. In addition, the flange can also be made to have a surface resistivity rating between $10^3$–$10^5$ ohm/cm. The flange protector does not rust, fade or tear. It also is light, light strong, resistant to ultraviolet light, reusable and has excellent printability. With regard to printability, it is common in the industry to color code or bar code the flange protector to designate the various sizes and types of pipes. With the flange protector manufactured with the above construction and material, the chances of the color code or bar code being faded and misidentification of pipe sizes can be virtually eliminated.

The invention has been described with reference to its preferred embodiments, which are intended to be illustrative and not limiting. For example, the invention has been described with reference to conventional flanged pipes, but other pipe shapes are possible that would require corresponding flange protector shapes. In addition, the present invention contemplates that corresponding means will be required to reliably connect the selected flange or pipe to the protective device subject to in-transit impact damage. Thus, variations and changes may be made without departing from the spirit and scope of the invention as defined in the following claims.

What is claimed is:

1. A flange protector for covering a machined surface of a pipe flange and adapted to cooperate with the pipe flange for securing the flange protector to the pipe flange comprising:

a plate member formed of a plastic material having a shape substantially matching a shape of and contacting the machined surface of the pipe flange; and
said plate member comprising a first end wall and a second end wall spaced from said first end wall, and a plurality of interior wall members extending between said first and second end walls to define a plurality of air channels located between the first end wall and the second end wall.

2. The flange protector according to claim 1, wherein the plate member is a circular plate having a peripheral edge.

3. The flange protector according to claim 2, wherein the plurality of air channels open to the peripheral edge of the circular plate.

4. The flange protector according to claim 3, wherein each of said plurality of interior walls and each of said plurality of air channels define a chord of said circular plate.

5. The flange protector according to claim 2, wherein each of said plurality of interior walls is resilient and has a crush resistance of about 34–80 lbs./inch.

6. The flange protector according to claim 1, wherein said plastic material is a polypropylene copolymer.

7. The flange protector according to claim 1, wherein said circular plate member has a thickness of 3–5 mm, a compression load of about 485–1482 lbs, a distortion of about 0.472–0.787 inches, and a unit weight of about 0.169–0.190 lb./ft.$^2$.

8. The flange protector according to claim 1, wherein said plastic material has a surface resistivity of about $10^3$–$10^5$ ohm/cm$^2$.

9. A protector for protecting an external machined surface of a conduit comprising:

a circular plastic plate member for contacting the external machined surface and having a plurality of parallel air channels defined by a first wall, a second wall spaced from the first wall and a plurality of channel defining walls having a first longitudinal edge connected to said first wall and a second longitudinal edge connected to said second wall.

10. The protector according to claim 9, wherein said plurality of channel defining walls biases the first and second walls apart upon the application of a load.

11. The protector according to claim 9, wherein said circular plastic plate member has a thickness of about 5 mm and a unit weight of 0.190 lb./ft.$^2$.

12. The protector according to claim 9, wherein the circular plate member has a peripheral edge and the plurality of parallel air channels open to the peripheral edge.

13. The protector according to claim 12, wherein each of said plurality of air channels defines a chord of the circular plastic plate.

14. The protector according to claim 9, wherein said circular plastic plate member includes means for indicating the size and type of pipe.

15. The flange protector according to claim 9, further comprising means for attaching the protector to the conduit.

16. A protector for an external machined surface of a pipe comprising a plastic plate member having a unit weight of 0.169–0.190 lb./ft.$^2$ and a thickness of 3–5 mm; the plate member having a shape corresponding to a shape of and contacting the external machined surface of said pipe and means for allowing attachment of the plate member to the pipe.

17. The protector according to claim 16, wherein said plastic plate member comprises a double-walled board.

18. The protector according to claim 17, wherein said board includes a plurality of air channels located between circular plates and interior walls that define the double-walled board.

19. The protector according to claim 18, wherein said protector comprises a polypropylene copolymer.

* * * * *